(12) United States Patent
Tsuchiya

(10) Patent No.: US 8,279,534 B2
(45) Date of Patent: Oct. 2, 2012

(54) LENS DRIVING DEVICE AND ELECTRONIC EQUIPMENT

(75) Inventor: Tadashi Tsuchiya, Chiba (JP)

(73) Assignee: Seiko Instruments Inc. (JP)

( * ) Notice: Subject to any disclaimer, the term of this patent is extended or adjusted under 35 U.S.C. 154(b) by 778 days.

(21) Appl. No.: 12/384,506

(22) Filed: Apr. 6, 2009

(65) Prior Publication Data

US 2009/0249901 A1 Oct. 8, 2009

(30) Foreign Application Priority Data

Apr. 7, 2008 (JP) ................................. 2008-099274

(51) Int. Cl.
*G02B 15/14* (2006.01)
*G02B 7/02* (2006.01)
*G03B 17/00* (2006.01)

(52) U.S. Cl. .......... 359/696; 359/822; 359/823; 396/55; 396/144

(58) Field of Classification Search .................. 359/557, 359/694–701, 822–824; 396/55, 144; 348/208.2, 348/208.4, 208.7; 369/44.11, 44.14, 44.15, 369/263.1; 720/659; 74/24, 89.23
See application file for complete search history.

(56) References Cited

U.S. PATENT DOCUMENTS

| 5,987,262 | A | 11/1999 | Higuchi et al. | 396/144 |
| 7,099,088 | B2 * | 8/2006 | Okuda | 359/696 |
| 7,486,452 | B2 * | 2/2009 | Kinoshita et al. | 359/813 |
| 7,576,931 | B2 * | 8/2009 | Ishimasa et al. | 359/822 |
| 7,746,564 | B2 * | 6/2010 | Miyamoto | 359/696 |
| 7,974,024 | B2 * | 7/2011 | Ishimasa et al. | 359/823 |
| 7,995,450 | B2 * | 8/2011 | Ono et al. | 369/263.1 |

OTHER PUBLICATIONS

Patent Abstracts of Japan, publication No. 2006-098464 publication date Apr. 13, 2006.

* cited by examiner

*Primary Examiner* — Loha Ben
(74) *Attorney, Agent, or Firm* — Adams & Wilks

(57) ABSTRACT

A lens driving device has a motor mounted to a plate, a lead screw connected to the motor for undergoing rotation about an axial line thereof, a nut threadingly engaged with the lead screw, and a casing mounted to the plate for housing the lead screw and the nut. The nut has a convex protruding portion protruding outwardly from an outer peripheral surface of the nut. The casing has a fitting groove linearly formed in the casing in a direction of the axial line for receiving the protruding portion in a state in which the protruding portion is fitted in the fitting groove so as to regulate rotation of the nut, and for movably guiding the protruding portion in the fitted state in the direction of the axial line to move the nut back and forth along the lead screw. At least one of the casing and the protruding portion of the nut has a tapered surface formed so as to forcibly guide the protruding portion toward the fitting groove to gradually fit the protruding portion into the fitting groove when the casing and the plate are mounted together.

18 Claims, 11 Drawing Sheets

LENS DRIVING DEVICE AND ELECTRONIC EQUIPMENT

BACKGROUND OF THE INVENTION

1. Field of the Invention

The present invention relates to a lens driving device for focusing or adjusting a focus (zoom) of a digital camera, a portable telephone with a camera, or a disk reader, and electronic equipment including the same.

2. Description of the Related Art

Conventionally, in electronic equipment such as a digital camera, a portable telephone with a camera, or a disk reader targeting a next-generation optical disk, focusing or focus adjustment has generally been performed by using a lens driving device to adjust a lens position.

Various types of lens driving devices have been available, a representative one of which adjusts a lens position by using a nut and a lead screw. The lens driving device of this type typically includes a lead screw rotated by a motor, a nut threadingly engaged with the lead screw, a lens frame provided to move back and forth along a guide shaft disposed in an optical axis direction in its abutting state on the nut and to fix a lens, and a rotation regulation unit for regulating rotation of the nut (e.g., refer to JP 2006-98464 A and U.S. Pat. No. 5,987,262).

In the lens driving device thus configured, when the motor is driven to rotate the lead screw, the nut may rotate in accordance therewith. However, the nut moves back and forth in an axial direction of the lead screw because its rotation is regulated by the rotation regulation unit. The lens frame abutting the nut accordingly moves back and forth together with the nut along the guide shaft. Thus, the lens fixed to the lens frame can be moved back and forth in the optical axis direction. As a result, the position of the lens can be adjusted to enable focusing or focus adjustment.

However, the conventional lens driving device still has the following problems.

First, in order to move the nut back and forth through rotating the lead screw, it is necessary to regulate the rotation of the nut by the rotation regulation unit. If rotation regulation is uncertain, the nut is rotated in accordance with rotation of the lead screw, disabling back-and-forth movement of the nut. Thus, when the lens driving device is assembled, combination of the nut with the rotation regulation unit has to be ensured to surely regulate rotation of the nut.

Conventionally, however, no adequate consideration has been given to combination of the nut with the rotation regulation unit. Thus, during assembling, the nut has had to be blindly combined with the rotation regulation unit through a peephole formed in a module, or simultaneously combined while regulating the direction of the nut by using a special jig. As a result, the assembling has become complex and difficult, and assembling failures or damages of various components have resulted in increasing costs.

Additionally, to realize further downsizing of the electronic equipment on which the lens driving device is mounted, there is a demand for downsizing of the nut itself. There is also a demand for improvement of assembling performance to achieve much higher manufacturing efficiency simultaneously with downsizing. In the conventional lens driving device, however, the aforementioned reason has made it difficult to meet such needs.

SUMMARY OF THE INVENTION

The present invention has been made in view of the above-mentioned circumstances, and therefore an object of the present invention is to provide a lens driving device which enables any user to easily and surely assemble the device while rotation of a nut is regulated, thereby improving assembling performance without damaging any components, and to provide an electronic equipment including the lens driving device.

To achieve the above-mentioned object, the present invention provides the following means.

A lens driving device according to the present invention includes: a motor fixed to a plate; a lead screw connected to the motor to be rotated about an axial line thereof; a nut threadingly engaged with the lead screw; a convex protruding portion formed to protrude outward from an outer peripheral surface of the nut; a casing fixed to the plate, for housing the lead screw and the nut; a fitting groove linearly formed in the casing in a direction of the axial line, for fitting the protruding portion in the fitting groove so as to regulate rotation of the nut, and movably guiding the protruding portion in a fitted state in the direction of the axial line to move the nut back and forth along the lead screw; and a lens frame, including: a lens holding portion for holding a lens; and an abutting portion abutting the nut, the lens frame being supported on the casing so as to move in the direction of the axial line and to move in accordance with back-and-forth movement of the nut to move the lens back and forth in the direction of the axial line. At least one of the casing and the protruding portion has a tapered surface formed so as to forcibly guide the protruding portion toward the fitting groove to gradually change to the fitted state when the casing and the plate are combined together.

In the lens driving device of the present invention, the protruding portion formed in the nut is fitted in the linear fitting groove formed in the casing in the direction of the axial line of the lead screw. The rotation of the nut is accordingly regulated so that, when the lead screw rotates in the direction of the axial line, the nut is not rotated in accordance therewith. Moreover, the protruding portion is guided to freely move in the direction of the axial line while being fitted in the fitting groove.

Thus, driving the motor to rotate the lead screw about the axial line enables back-and-forth movement of the nut in the direction of the axial line. When the nut moves back and forth, the lens frame having the abutting portion abutting the nut moves in accordance therewith in the direction of the axial line. Thus, the lens held by the lens holding portion of the lens frame can be moved, and a position of the lens can be adjusted. As a result, focusing or focus adjustment can be performed.

To assemble the lens driving device thus configured, first, the nut is threadingly engaged with the lead screw connected to the motor fixed to the plate. In this case, the nut is threadingly engaged so that the protruding portion of the nut can be directed in a predetermined direction. Specifically, when the plate is combined with the casing, the nut is threadingly engaged so that the protruding portion can face the fitting groove side.

Then, combination of the plate with the casing movably supporting the lens frame is carried out. In this case, the plate is combined with the casing so that the protruding portion of the nut can be fitted in the fitting groove formed in the casing.

The at least one of the casing and the protruding portion has the tapered surface formed so as to forcibly guide the protruding portion toward the fitting groove to gradually change to the fitted state. Thus, unlike the conventional case, even when slight shifting occurs in positional relationship between the protruding portion and the fitting groove, this positional shifting can be rectified by the tapered surface. In other words, unlike the conventional case, the protruding portion and the fitting groove do not have to be accurately aligned with each other to be blindly combined together.

Thus, any user can easily and surely assemble the plate and the casing while the rotation of the nut is regulated, and thereby complete the lens driving device. Moreover, by using a force when the plate is combined with the casing, the protruding portion can be naturally guided to the fitting groove while sliding on the tapered surface. Thus, the transfer of unnecessary and excessive forces to various components is difficult during combination of the plate with the casing. As a result, a risk of damaging various components can be reduced, and cost increases caused by damages can be suppressed.

In the lens driving device according to the present invention, the fitting groove is formed so as to pass through the casing so that the protruding portion is visible from an outside of the casing.

In the lens driving device of the present invention, the fitting groove is formed so as to pass through the casing. Thus, during assembling, the fitted state of the protruding portion in the fitting groove can be viewed from the outside of the casing. As a result, accuracy of assembling can be enhanced to increase reliability of the lens driving device.

In the lens driving device according to the present invention, the fitting groove is formed so that one end side thereof is opened to a side surface of the casing, and the casing and the plate are combined together so as to freely slide so that the protruding portion is slid from the one end side of the fitting groove to be fitted.

In the lens driving device of the present invention, the fitting groove is formed so that the one end side thereof can be opened to the side surface of the casing. Thus, when the casing and the plate are combined together, assembling can be carried out by sliding the casing and the plate so as to slide the protruding portion from the opened one end side of the fitting groove. As a result, the work of combining the plate with the casing can be easily and surely carried out, thereby improving assembling performance.

In the lens driving device according to the present invention, the nut includes a convex portion formed so as to protrude toward the plate, and when the nut is threadingly engaged with the lead screw, the convex portion comes into contact with the plate to set the rotation of the nut within a predetermined rotational angle range, and to position the protruding portion within a predetermined fixed range.

In the lens driving device of the present invention, the convex portion is formed on the nut. Thus, when the nut is threadingly engaged with the lead screw, the nut can be naturally threadingly engaged without being held by fingers. In other words, when the lead screw is rotated to threadingly engage the nut, the nut rotates in accordance with the lead screw. However, after the nut slightly rotates, the convex portion protruding toward the plate comes into contact with the plate. Further rotation of the nut can accordingly be regulated, enabling the rotation to be set within the predetermined rotational angle range. As a result, the position of the protruding portion can be set within the predetermined fixed range, and the nut can be threadingly engaged in a state where the protruding portion is always directed in the same direction.

The nut can be threadingly engaged even without being held by fingers while naturally setting the direction of the protruding portion in the same direction every time, and hence assembling performance can be further improved.

An electronic equipment according to the present invention includes the lens driving device according to the present invention.

The electronic equipment of the present invention includes the inexpensive lens driving device of the present invention which exhibits improved assembling performance and high reliability. Thus, reliability can similarly be improved to achieve higher quality and lower costs.

According to the lens driving device of the present invention, any user can easily and surely perform assembling while the rotation of the nut is regulated, and assembling performance can be improved without damaging any components. Thus, the lens driving device can be made inexpensive and high in reliability and quality. The protruding portion can be naturally guided to the fitting groove, and hence, even when the nut is downsized, the user can easily and surely perform assembling continuously irrespective of a size of the nut. As a result, any future needs of downsizing are met.

The electronic equipment of the present invention includes the above-mentioned lens driving device. Thus, reliability can be improved, high quality can be achieved, and costs can be reduced.

DETAILED DESCRIPTION OF THE PREFERRED EMBODIMENT

Referring to FIGS. 1 to 16, a preferred embodiment of the present invention is described below.

A lens driving device of this embodiment is mounted on electronic equipment such as a camera, a portable telephone with a camera, or a disk reader targeting a next-generation optical disk, and moves a lens used for photographing or reading data back and forth to adjust a position thereof, thereby performing focus adjustment.

Figure 1:
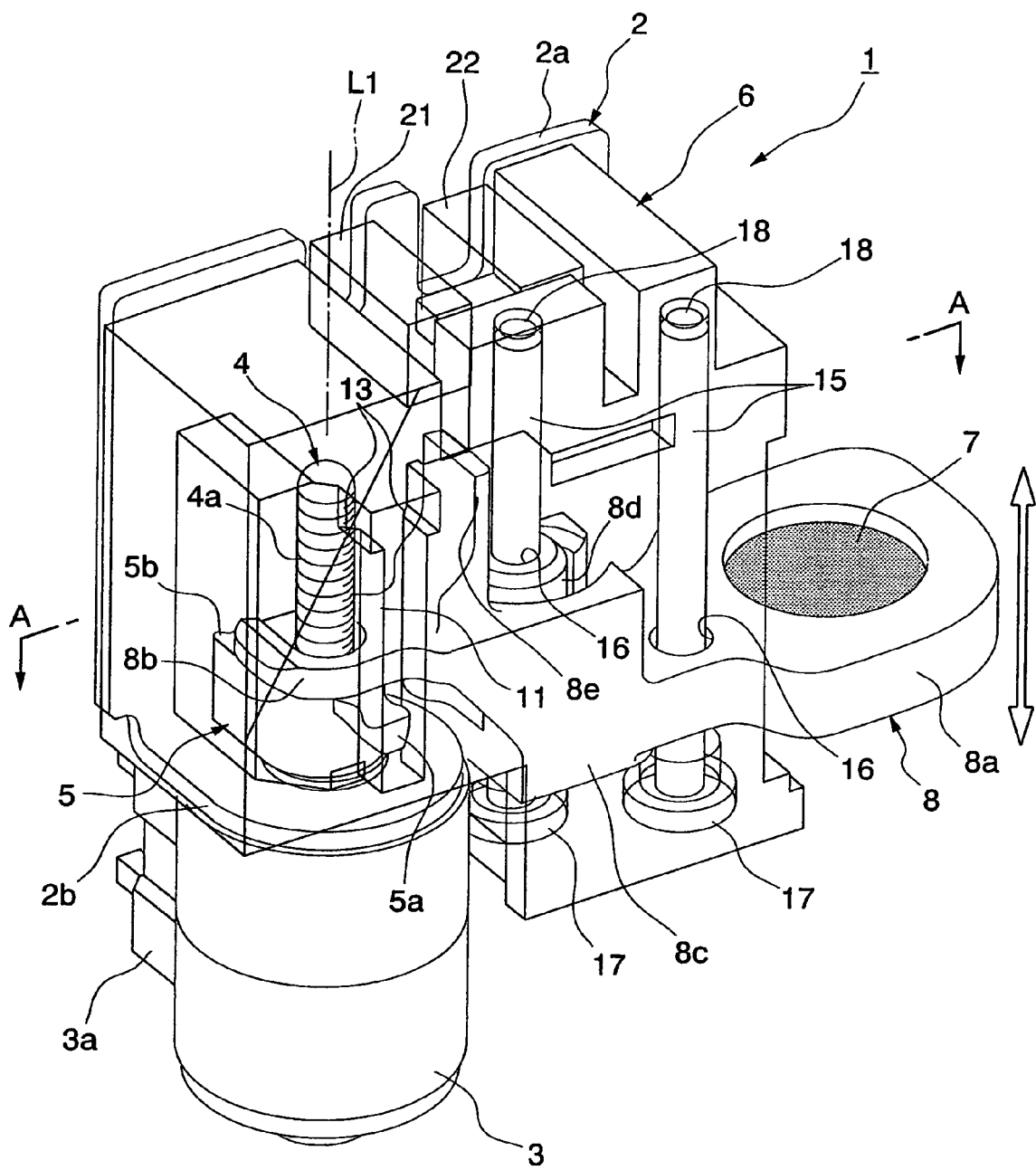
FIG. 1 is a perspective view illustrating a lens driving device according to an embodiment of the present invention.
Figure 2:
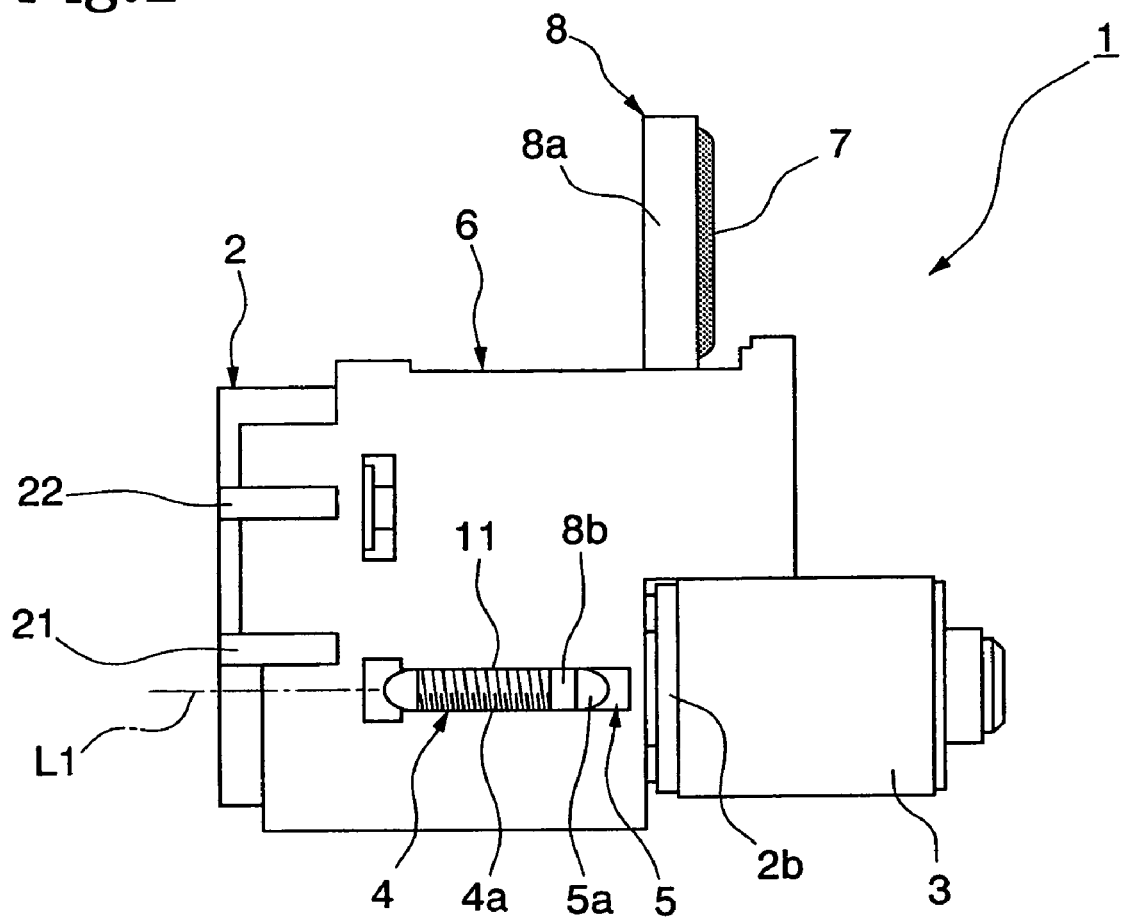
FIG. 2 is a front view illustrating the lens driving device of FIG. 1 seen from a casing side.
Figure 3:
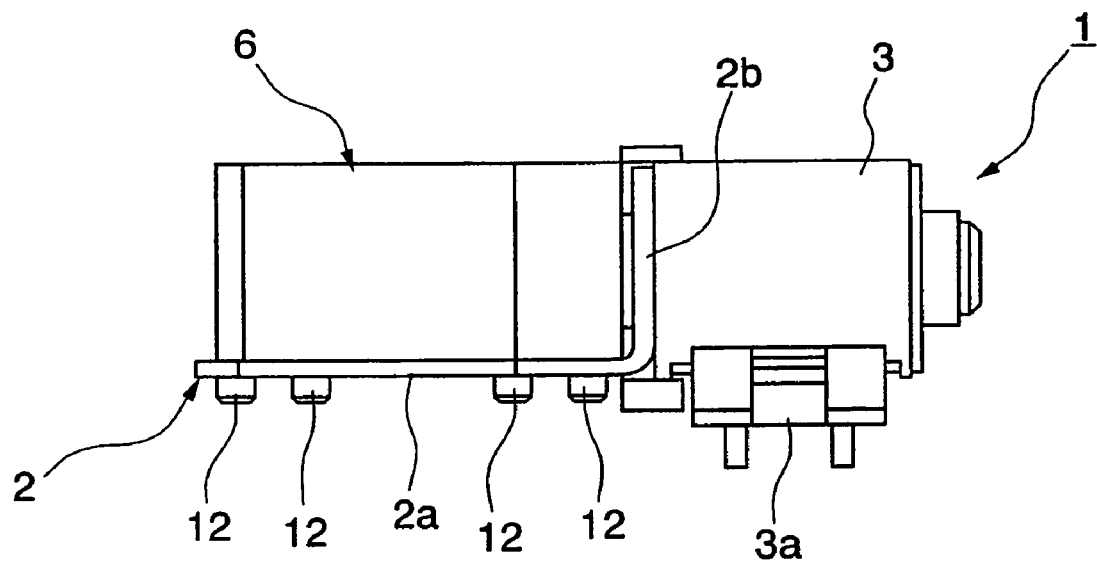
FIG. 3 is a side view illustrating the lens driving device of FIG. 1.
Figure 4:
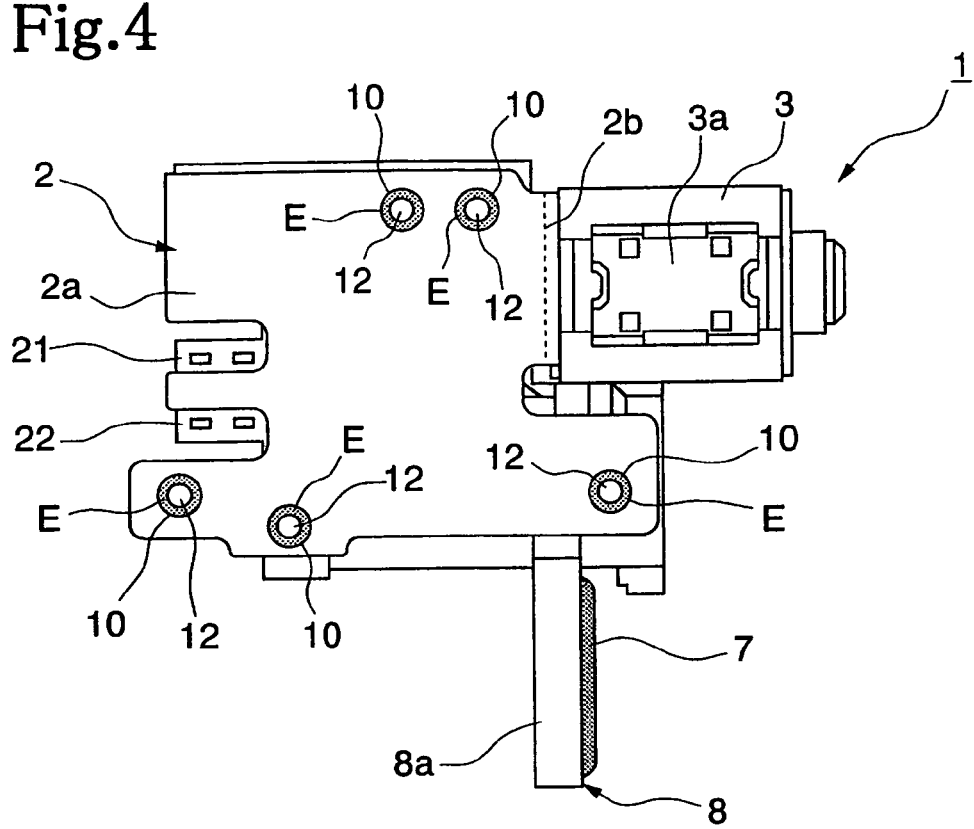
FIG. 4 is a front view illustrating the lens driving device of FIG. 1 seen from a plate side.

As schematically illustrated in FIGS. 1 to 5, a lens driving device 1 includes a motor 3 fixedly mounted to a plate 2, a lead screw 4 having its base end connected to the motor 3, a nut 5 threadingly engaged with the lead screw 4, a casing 6 detachably fixed to the plate 2, and a lens frame 8 for holding a lens 7. FIG. 1 illustrates a transparent state of the casing 6.

The plate 2 is made of a metal or plastic resin, and includes a plate main body 2a formed into a flat plate shape and a bent plate 2b bent by about 90° with respect to the plate main body 2a, which are integrally formed. The plate main body 2a includes several insertion ports 10 into which fixing pins 12 formed in the casing 6 are inserted.

The motor 3 is fixedly mounted to the bent plate 2b in a direction where the lead screw 4 is disposed on the plate main body 2a. This lead screw 4 has its base end connected to a motor shaft (not shown) of the motor 3 as described above, and is driven by the motor 3 to rotate about an axial line L1. On an outer peripheral surface of the lead screw 4, a screw groove 4a is formed from the base end to the tip.

The motor 3 includes a fixing terminal 3a disposed to enable attachment to a casing of the electronic equipment on which the lens driving device is mounted, and electric connection to the outside.

The nut 5 is injection-molded by using a plastic resin, and includes a screw hole (not shown) formed substantially in its center to threadingly engage the screw groove 4a. The nut 5 is accordingly threadingly engaged with the lead screw 4. A part of an outer peripheral surface of the nut 5 is formed into a circular-arc curved surface, and a convex protruding portion 5a is formed to protrude outward from this curved surface. The protruding portion 5a is fitted in a fitting groove 11 formed in the casing 6. In other words, the nut 5 is threadingly engaged with the lead screw 4 while the protruding portion 5a is fitted in the fitting groove 11.

Figure 6:
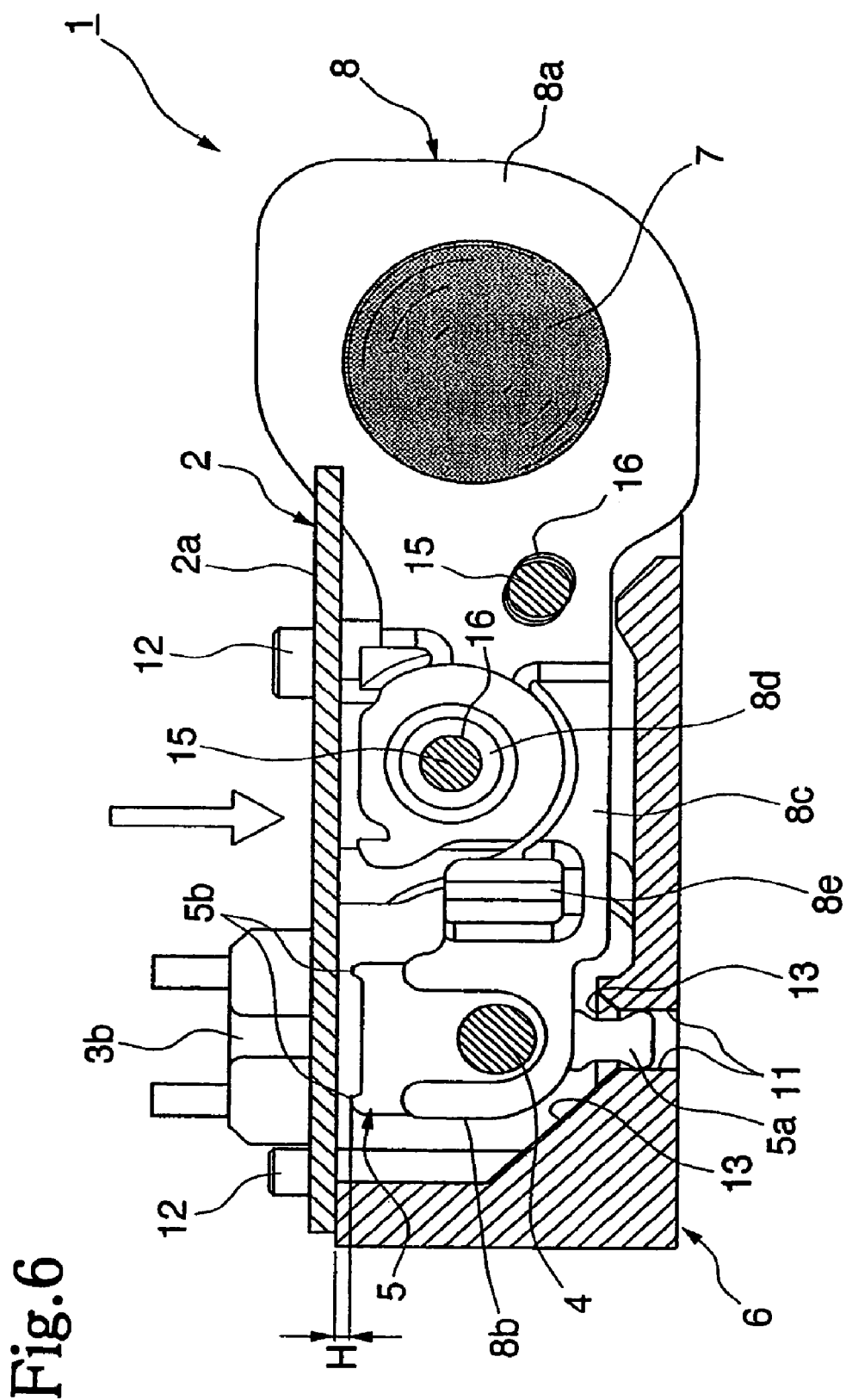
FIG. 6 is a sectional view of the lens driving device illustrated in FIG. 1 cut on the line A-A.

As illustrated in FIGS. 1 and 6, the protruding portion 5a has its substantially-mid-portion constricted and is designed so that the tip fitted in the fitting groove 11 can come into point-contact with the fitting groove 11. Thus, the protruding portion 5a and the fitting groove 11 are disposed to come into contact with each other by a smallest contact area.

A portion of the outer peripheral surface of the nut 5 opposite to the side where the protruding portion 5a is formed is flat. This flat portion includes two convex portions 5b formed to protrude toward the plate 2. Those convex portions 5b are formed so that a space with the plate main body 2a can be a predetermined distance H while the protruding portion 5a is fitted in the fitting groove 11, and highly accurately adjust an interval. The two convex portions 5b enable, when the nut 5 is threadingly engaged with the lead screw 4, setting of rotation of the nut 5 within a predetermined rotational angle range θ, and positioning of the protruding portion 5a within a predetermined fixed range. This is described below more in detail.

Figure 5:
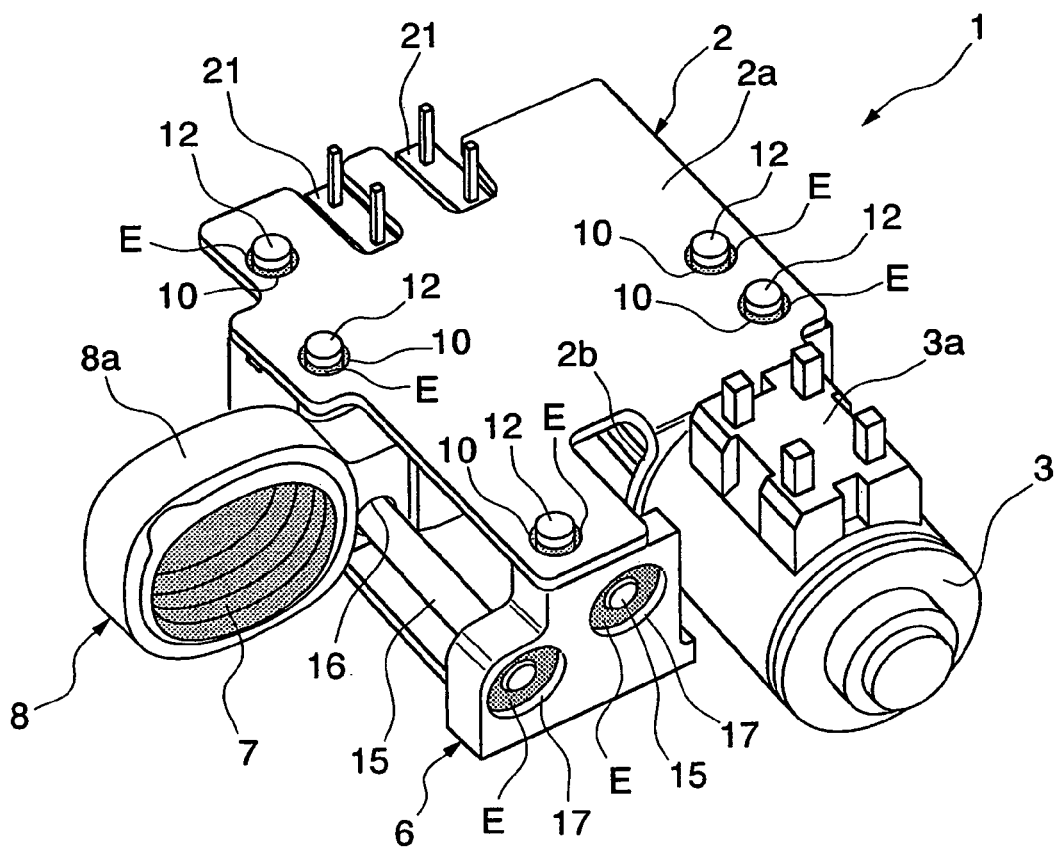
FIG. 5 is a perspective view illustrating the lens driving device of FIG. 1 where a plate is turned up.
Figure 7:
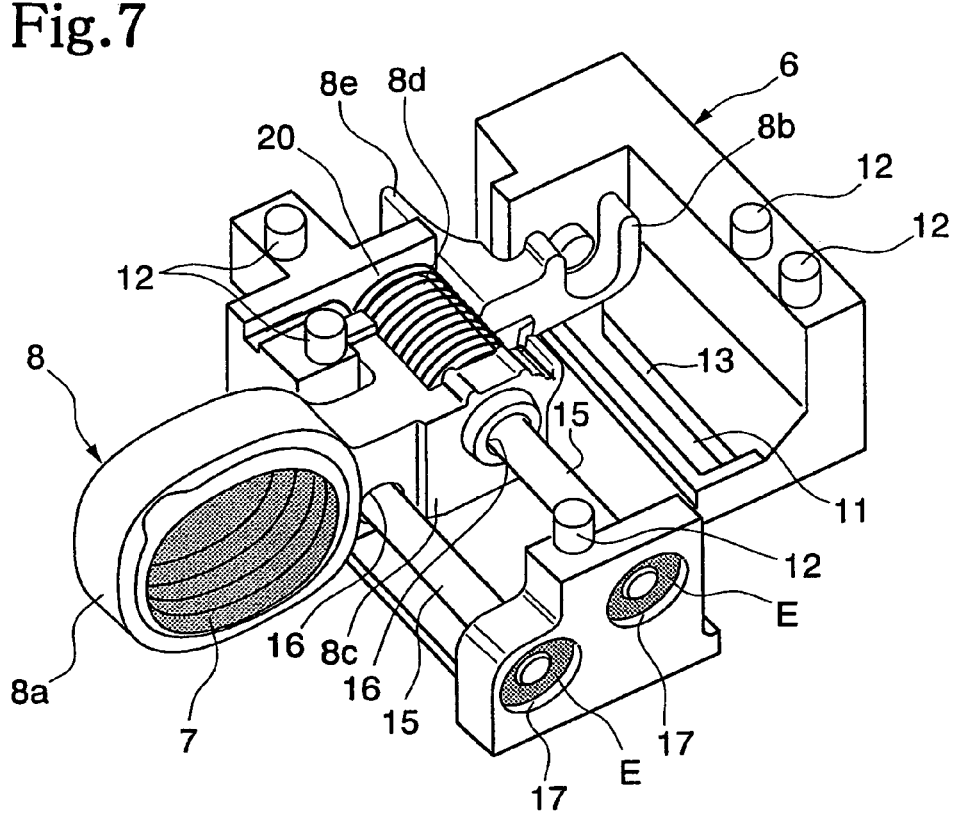
FIG. 7 is a perspective view illustrating a casing of FIG. 1 seen from a backside.

As illustrated in FIGS. 1 to 5, the casing 6 is injection-molded by using a plastic resin as in the case of the nut 5, and houses and protects the lead screw 4, the nut 5, and a part of the lens frame 8 when mounted to the plate 2. A surface in contact with the plate 2 includes, as illustrated in FIG. 7, a plurality of the fixing pins 12 formed to be inserted into the insertion ports 10 of the plate 2. After the fixing pins 12 are inserted into the insertion ports 10, the casing 6 is mounted to the plate 2 by using adhesives E to bond the fixing pins and the insertion holes together as illustrated in FIG. 5.

As illustrated in FIG. 1, a top plate of the casing 6 includes the fitting groove 11 formed to fit the protruding portion 5a of the nut 5. This fitting groove 11 is formed to be linear by a length substantially equal to the lead screw 4 in a direction of the axial line L1 of the lead screw 4. The fitting groove 11 is formed to pass through the casing 6 to enable viewing of the fitted protruding portion 5a from the outside of the casing 6. This fitting groove 11 regulates rotation of the nut 5 in cooperation with the protruding portion 5a. In other words, the fitting groove 11 and the protruding portion 5a function as rotation regulation means for regulating the rotation of the nut 5. Moreover, the fitting groove 11 movably guides the protruding portion 5a in the direction of the axial line L1 in its fitted state to enable back-and-forth movement of the nut 5 along the lead screw 4.

As illustrated in FIG. 6, the casing 6 of this embodiment has a tapered surface 13 formed along the fitting groove 11 to forcibly guide the protruding portion 5a toward the fitting groove 11 to gradually change to a fitted state when the casing 6 and the plate 2 are combined together. In other words, when the plate 2 and the casing 6 are stacked to be combined together, the protruding portion 5a can be slid on the tapered surface 13 to be gradually and forcibly guided to fit in the fitting groove 11. This is described below in detail.

As illustrated in FIGS. 1 and 7, the lens frame 8 is injection-molded by a plastic resin as in the case of the nut 5, supported on the casing 6 to be movable in the direction of the axial line L1, and moved in accordance with back-and-forth movement of the nut 5 to move the lens 7 back and forth in the direction of the axial line L1.

Specifically, the lens frame 8 includes a lens holding portion 8a for holding the lens 7, an abutting portion 8b abutting the nut 5, and a guiding portion 8c disposed between the lens holding portion 8a and the abutting portion 8b, which are integrally formed. The lens holding portion 8a holds the lens 7 to surround the lens 7. The abutting portion 8b is formed into a U shape when seen from a plane so as not to interfere with the lead screw 4, and abuts an end surface of the nut 5.

The guiding portion 8c includes insertion ports 16 formed to insert two guide shafts 15 disposed in parallel to the direction of the axial line L1 of the lead screw 4. The guide shaft 15 is first described. This guide shaft 15 can be inserted from an insertion port 17 formed on a side surface of the casing 6 into the casing 6, and spaced from another guide shaft 15 so as to be in parallel to the lead screw 4 when inserted. In this case, the guide shaft 15 is press-fitted into a support hole 18 formed on a side surface of the casing 6 opposite to the inserted side of the insertion port 17. The insertion port 17 is filled with the adhesive E after the guide shaft 15 is inserted. The guide shaft 15 is accordingly fixed completely to the casing 6.

The guiding portion 8c is supported through an intermediation of the guide shaft 15 fixed to the casing 6. Thus, the lens frame 8 can be moved along the guide shaft 15 as described above, in other words, in the direction of the axial line L1 of the lead screw 4.

The guiding portion 8c includes a substantially cylindrical spring housing portion 8d around which a coil spring 20 is fitted and which is formed concentrically to one insertion port 16. As illustrated in FIG. 7, the coil spring 20 fitted around the spring housing portion 8d has one end fixed to the guiding portion 8c and the other end fixed to the inside of the casing 6, and always urges the lens frame 8 to the nut 5 by a spring force. Thus, the abutting portion 8b of the lens frame 8 is always pressed to the end surface of the nut 5, and its abutting state on the nut 5 is maintained.

The guiding portion 8c further includes a shield 8e extending in the direction of the axial line L1 of the lead screw 4. As illustrated in FIG. 1, this shield 8e is positioned, when the lens frame 8 moves away from the motor 3, between a light emitting unit 21 and a light receiving unit 22 to physically block light (not shown) emitted from the light emitting unit 21 to the light receiving unit 22.

The light emitting unit 21 and light receiving unit 22 are spaced from each other to be bonded and fixed to the casing 6, and function as original point detection sensors for detecting an original point position of the lens frame 8. In other words, monitoring a detection result (whether light has been received) of the light receiving unit 22 enables detection of whether the shield 8e has been positioned between the light emitting unit 21 and the light receiving unit 22. A position of the lens frame 8 when the light is blocked is set as an original point position. After checking of the original point position of the lens frame 8, a moving direction and a moving amount of the lens frame 8 are accurately controlled based on a pulse signal when the motor 3 is driven, whereby a position of the lens 7 can be highly accurately adjusted.

Next, a case of operating the lens driving device 1 thus configured to adjust the position of the lens 7 is described. It is presumed that the original point position of the lens frame 8 has been checked as an initial setting.

First, the motor 3 is driven to rotate the lead screw 4 about the axial line L1. The nut 5 threadingly engaged with the lead screw 4 tries to rotate in accordance therewith. However, the protruding portion 5a formed in the nut 5 is fitted in the linear fitting groove 11 formed in the casing 6, and hence the nut 5 is not rotated in accordance with the lead screw 4. The protruding portion 5a is guided to be movable in the direction of the axial line L1 while fitted in the fitting groove 11. Thus, rotating the lead screw 4 enables back-and-forth movement of the nut 5 in the direction of the axial line L1.

The back-and-forth movement of the nut 5 is accompanied by movement of the lens frame 8 having the abutting portion 8b abutting the end surface of the nut 5 in the direction of the axial line L1 while being guided by the guide shaft 15. The lens 7 held by the lens holding portion 8a can accordingly be moved, and its position can be adjusted. As a result, focusing or focus adjustment can be carried out.

Especially, the lens frame 8 is always urged by the coil spring 20, whereby the abutting portion 8b is pressed to the end surface of the nut 5. Thus, there is no play between the abutting portion 8b and the nut 5, and movement of the nut 5 can be quickly followed by movement of the lens frame 8 while backlash is suppressed. As a result, the position of the lens 7 can be highly accurately adjusted.

The tip of the protruding portion 5a fitted in the fitting groove 11 is in point-contact with the fitting groove 11, and friction resistance generated between the protruding portion 5a and the fitting groove 11 can accordingly be suppressed as much as possible when the nut 5 moves. Thus, a rotational force of the lead screw 4 can be directly converted into linear movement of the nut 5, and thrust reduction can be suppressed as much as possible. As a result, the position of the lens 7 can be efficiently adjusted while useless power consumption of the motor 3 is suppressed.

Because of small friction resistance, the protruding portion 5a can be moved along the fitting groove 11 without getting stuck. When sticking occurs, the lens frame 8 may be vibrated, or pulled to cause troubles such as falling or twisting of the guide shaft 15. However, in the lens driving device 1 of this embodiment, such troubles are difficult to occur.

Assembling of the lens driving device 1 of this embodiment is described.

Figure 8:
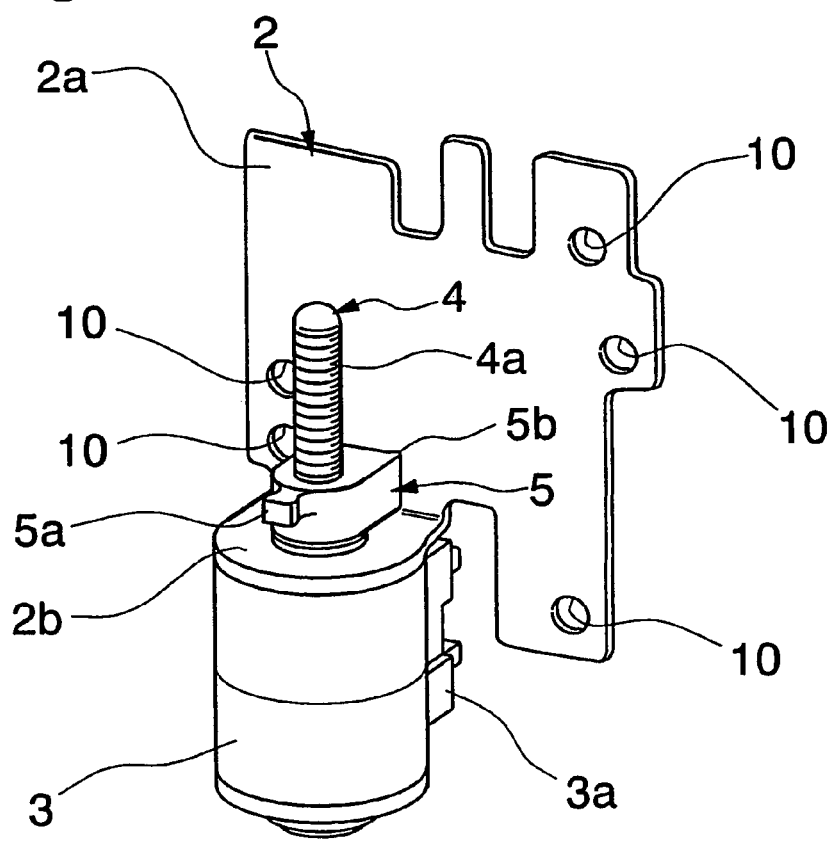
FIG. 8 is a process view of assembling of the lens driving device of FIG. 1, illustrating a state after a nut is threadingly engaged with a lead screw.

First, as illustrated in FIG. 8, the nut 5 is threadingly engaged with the lead screw 4 connected to the motor 3 fixed to the plate 2. In this case, the nut 5 is threadingly engaged so that the protruding portion 5a formed in the nut 5 can be set in a predetermined direction (toward the fitting groove 11 when the plate 2 and the casing 6 are subsequently stacked to be combined together).

Figure 9:
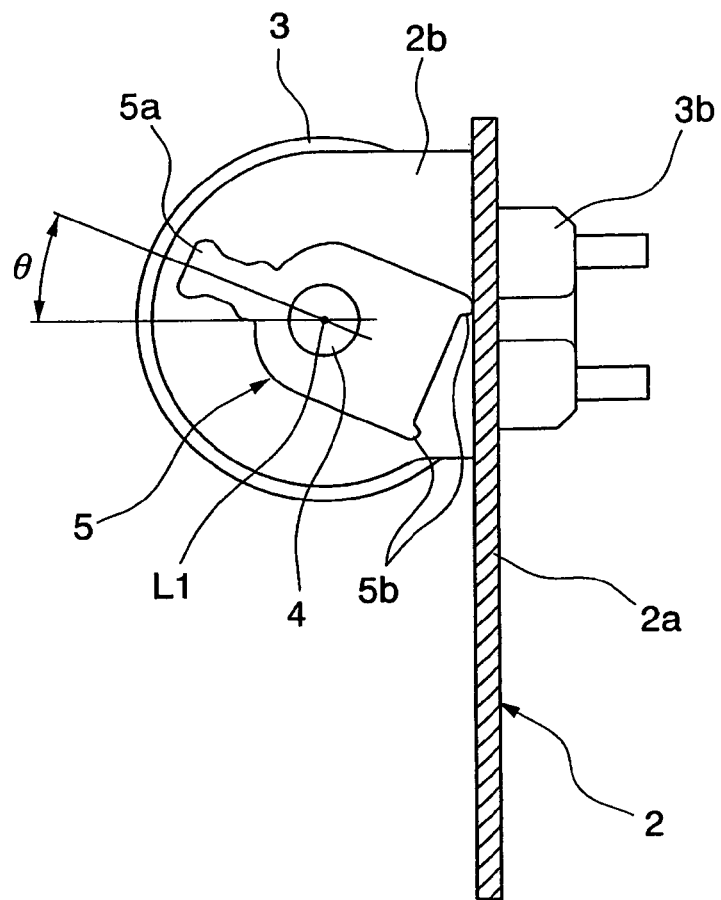
FIG. 9 is a diagram illustrating a state where a convex portion formed in the nut comes into contact with the plate to regulate rotation of the nut when the nut is threadingly engaged with the lead screw.

Especially during this process, the convex portion 5b is formed in the nut 5 of this embodiment, and hence the nut 5 can be naturally threadingly engaged without being held by fingers. In other words, when the lead screw 4 is rotated so as to threadingly engage the nut 5, as illustrated in FIG. 9, the nut 5 tries to rotate about the axial line L1 in accordance with the lead screw 4. However, the convex portion 5b comes into contact with the plate 2 after the nut 5 slightly rotates. Thus, further rotation of the nut 5 can be regulated, and the rotation can be set within a predetermined rotational angle range θ.

Accordingly, the protruding portion 5a can be positioned within a predetermined fixed range, and the nut 5 can be threadingly engaged in a state where the protruding portion 5a is always set in the same direction. Thus, the nut 5 can be threadingly engaged without being held by fingers while the protruding portion 5a is always set in the same direction naturally.

At the same timing as or a timing after/before the above-mentioned process, a process of fixing the lens frame 8 to the casing 6 is carried out.

Figure 10:
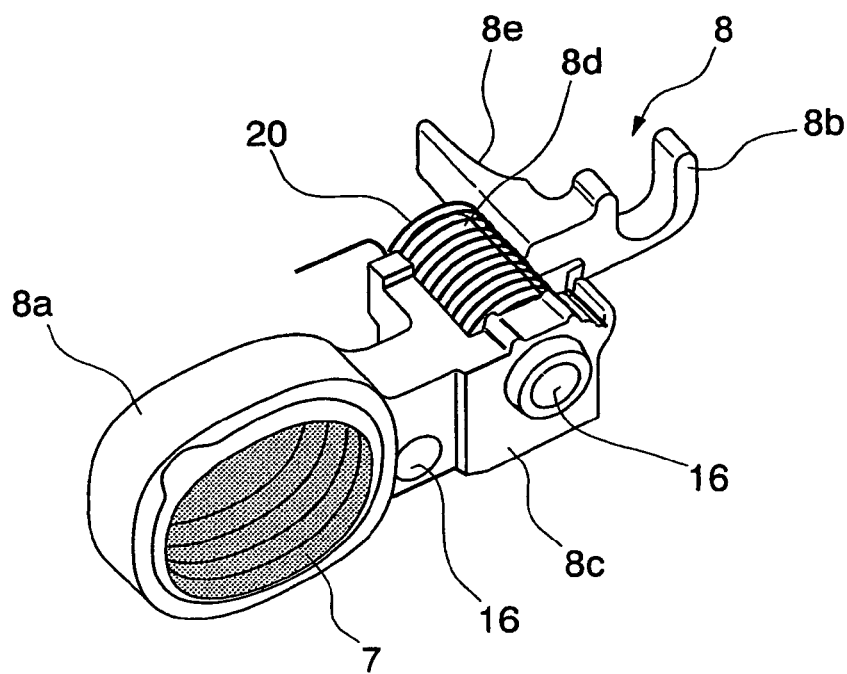
FIG. 10 is a process view of assembling of the lens driving device of FIG. 1, illustrating a state where a coil spring is fitted around a spring housing portion of a lens frame.
Figure 11:
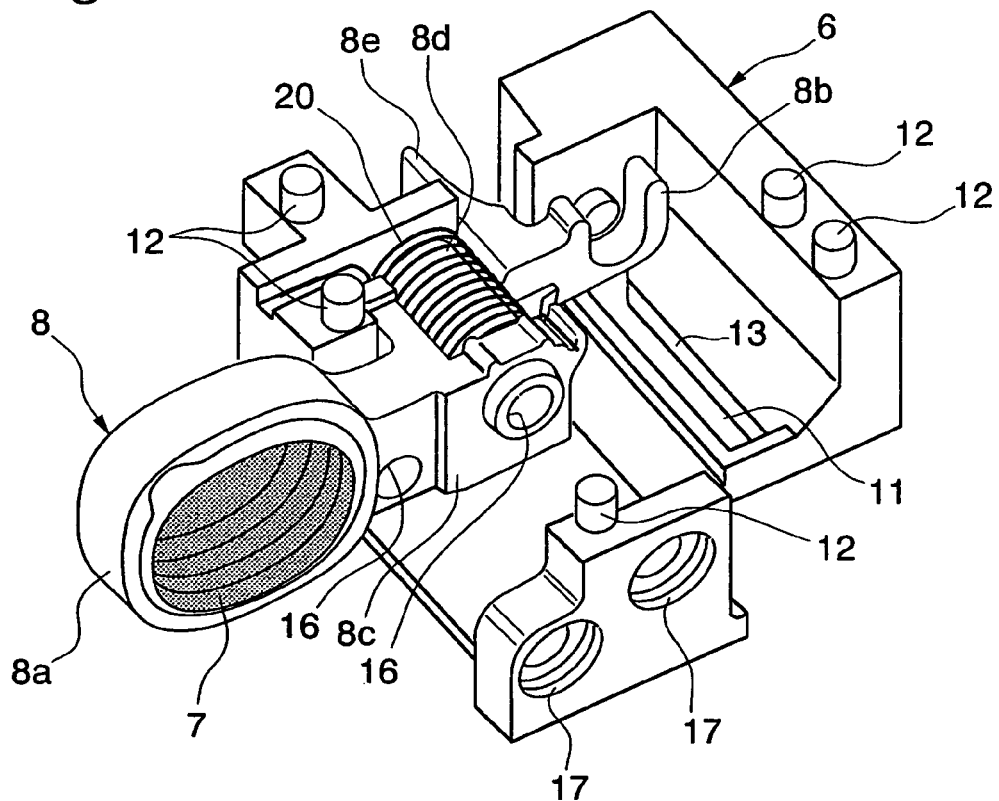
FIG. 11 is a process view of assembling of the lens driving device of FIG. 1, illustrating a state where the lens frame is set in the casing after the state illustrated in FIG. 10.
Figure 12:
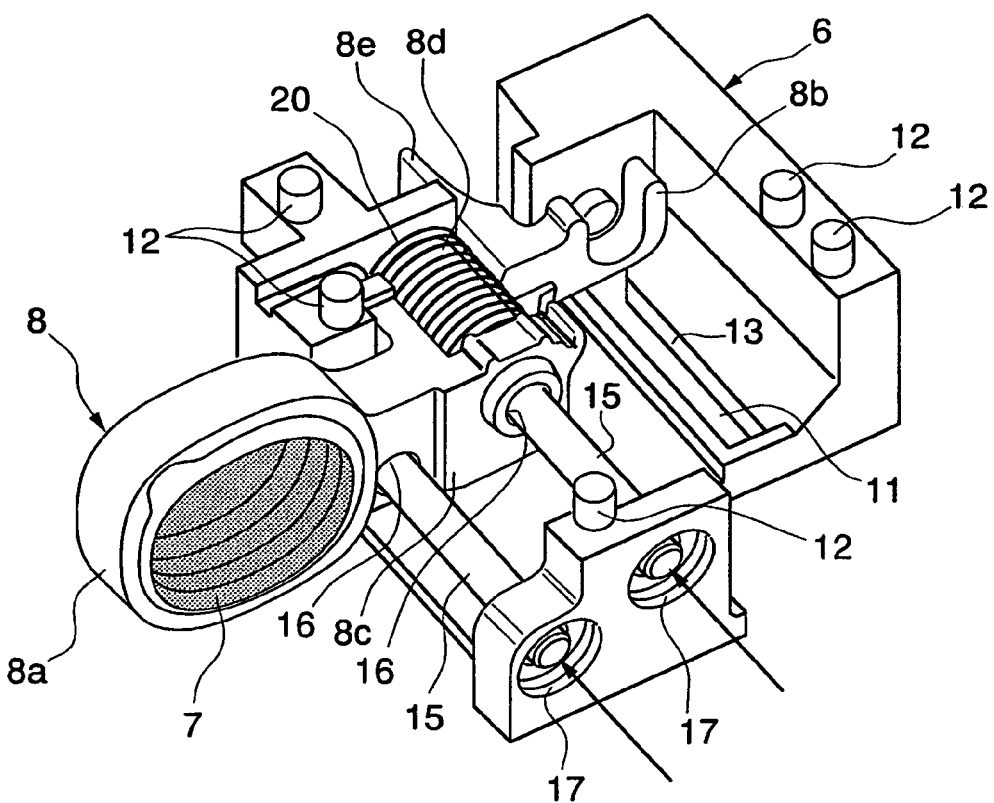
FIG. 12 is a process view of assembling of the lens driving device of FIG. 1, illustrating a state where a guide shaft is set in the casing after the state illustrated in FIG. 11.
Figure 13:
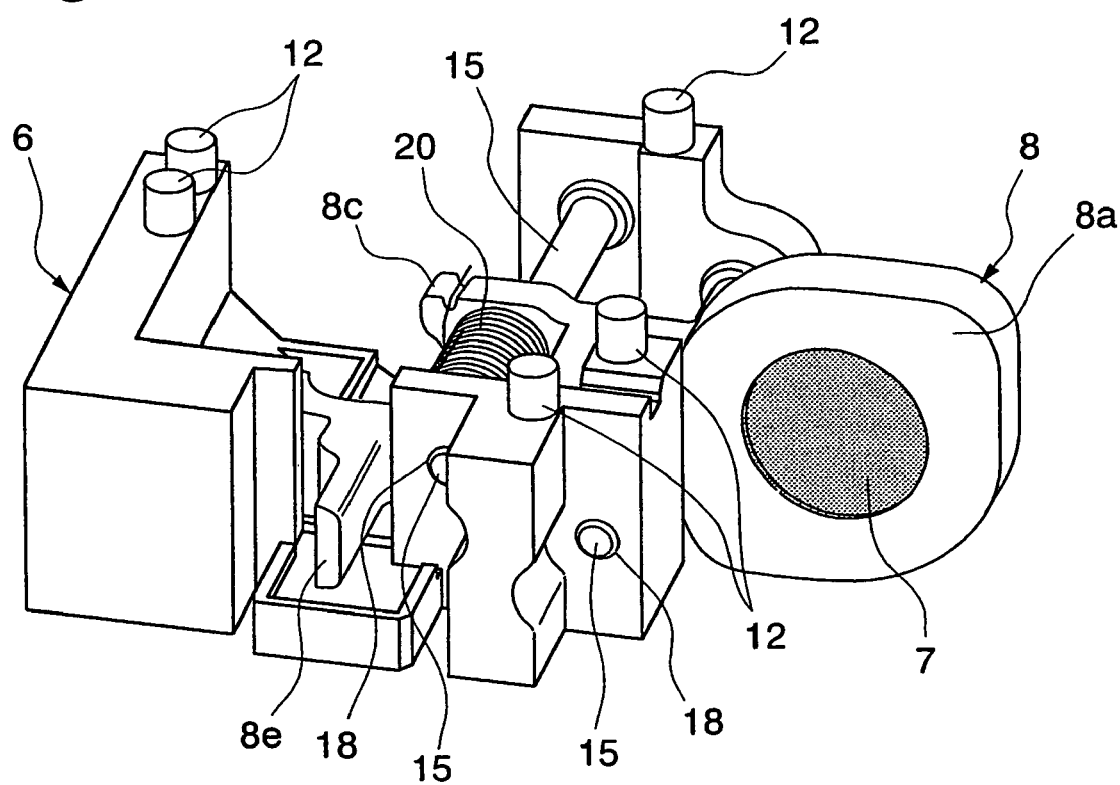
FIG. 13 is a diagram illustrating the state illustrated in FIG. 12 from a different viewpoint.

First, as illustrated in FIG. 10, the coil spring 20 is fitted around the spring housing portion 8d formed in the guiding portion 8c of the lens frame 8. In this case, one end of the coil spring 20 is fixed to the lens frame 8. Subsequently, as illustrated in FIG. 11, the lens frame 8 is set at a predetermined position of the casing 6, and then the other end of the coil spring 20 is fixed to the casing 6. As illustrated in FIGS. 12 and 13, the two guide shafts 15 are inserted from the insertion ports 17 formed in the side surface of the casing 6, and put through the insertion ports 16 formed in the lens frame 8 to be press-fitted into the support holes 18 formed in the side surface of the casing 6 opposite to the side of the insertion ports 17. Thus, by setting the guide shafts 15, the lens frame 8 is movably fixed to the casing 6. After setting of the guide shafts 15, as illustrated in FIG. 7, the adhesives E are filled into the insertion ports 17 of the casing 6 to be cured. Thus, the guide shafts 15 can be completely fixed to the casing 6.

Note that FIG. 7 and FIGS. 10 to 13 illustrate the state in which the coil spring 20 is contracted.

Next, a process of stacking the plate 2 having the motor 3 fixed thereto and the casing 6 movably supporting the lens frame 8 to combine them together is carried out.

Specifically, after the casing 6 is placed on a desk, the plate 2 is turned upside down to set the lead screw 4 and the nut 5 downward, and the plate 2 is stacked on the casing 6. In this case, the plate 2 is stacked in a manner of inserting the fixing pin 12 formed in the casing 6 into the insertion port 10 formed in the plate 2.

Figure 14:
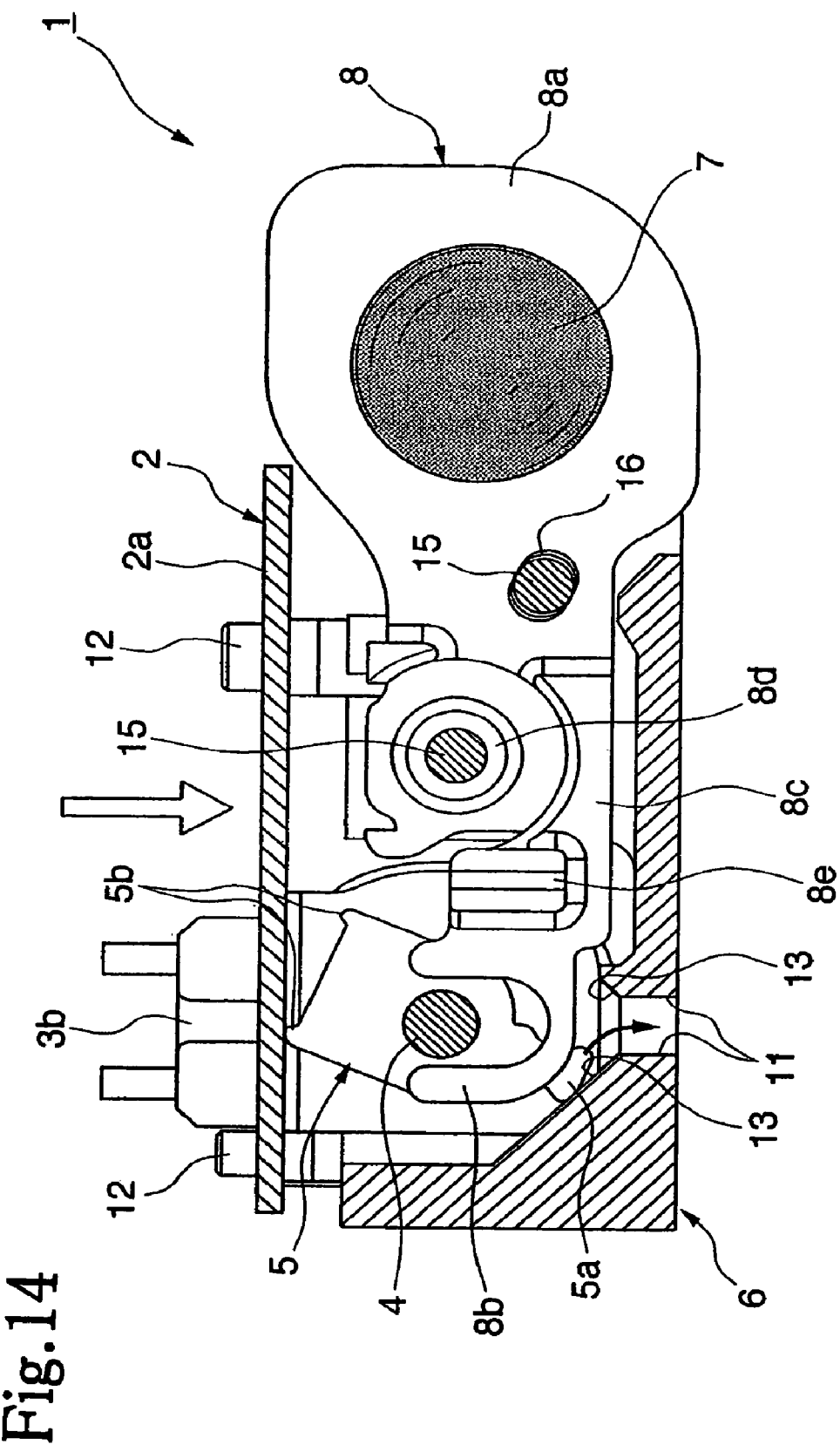
FIG. 14 is a process view of assembling of the lens driving device of FIG. 1, illustrating a state where the casing and the plate are stacked together, and a protruding portion of the nut is guided toward a fitting groove by a tapered surface.
Figure 15:
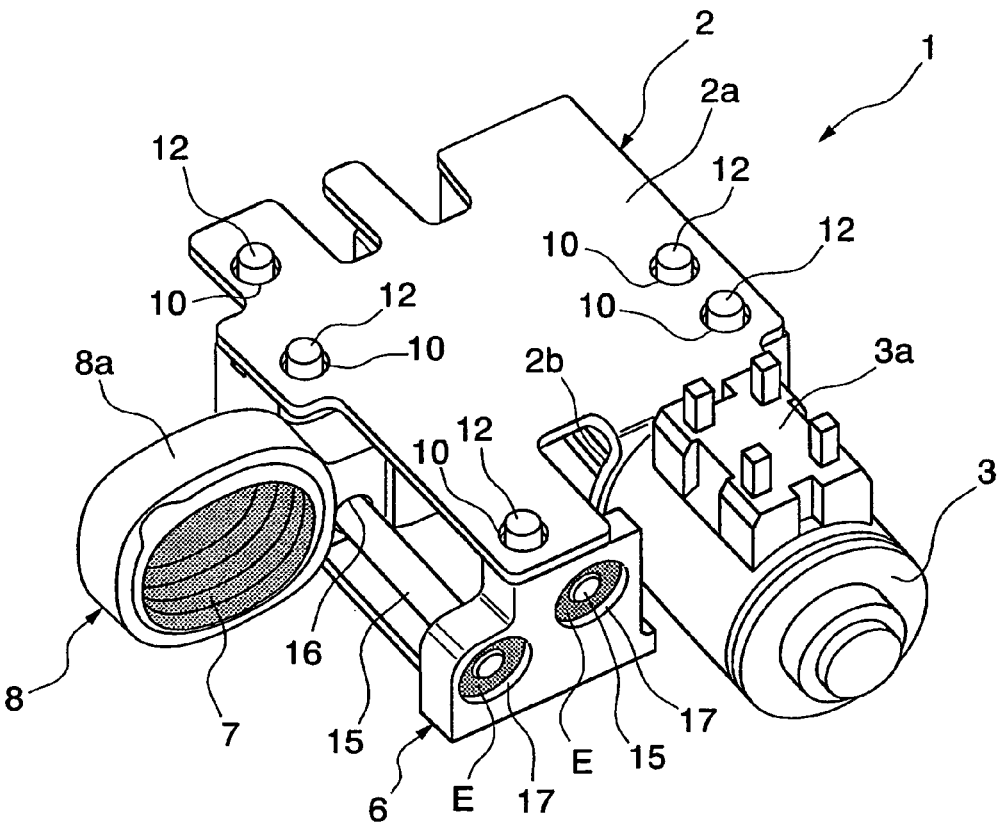
FIG. 15 is a process view of assembling of the lens driving device of FIG. 1, illustrating a state where the casing and the plate are completely stacked together after the state illustrated in FIG. 14.

The stacking of the plate 2 is accompanied by gradual approaching of the protruding portion 5a of the nut 5 to the fitting groove 11. Further approaching of both brings, as illustrated in FIG. 14, the tip of the protruding portion 5a into contact with the tapered surface 13 formed along the fitting groove 11. The protruding portion 5a accordingly slides on the tapered surface 13 to naturally change its direction, and is forcibly guided toward the fitting groove 11. Then, as illustrated in FIG. 15, after the plate 2 is completely stacked on the casing 6, the protruding portion 5a is fitted in the fitting groove 11 to be set in a fitted state as illustrated in FIG. 6.

The casing 6 has the tapered surface 13 formed to forcibly guide the protruding portion 5a toward the fitting groove 11 to gradually change to a fitted state, and hence unlike the conventional case, even when a positional relationship between the protruding portion 5a and the fitting groove 11 slightly changes, this positional shifting can be rectified by the tapered surface 13. In other words, unlike the conventional case, accurate alignment of the protruding portion 5a and the fitting groove 11 or blind combining of both is unnecessary.

Thus, any user can easily and accurately assemble the plate 2 and the casing 6 while the rotation of the nut 5 is regulated. Moreover, the protruding portion 5a can slide on the tapered surface 13 to be naturally guided to the fitting groove 11 by using a force of stacking the plate 2 on the casing 6, and hence transmission of an unnecessary excessive force to each component is difficult when combining together the plate 2 and casing 6. As a result, a fear of damage to each component can be reduced, thereby suppressing cost increases due to damages.

After the plate 2 and the casing 6 are stacked to be combined together, the adhesive E is applied to the insertion port 10 into which the fixing pin 12 has been inserted, and is cured. Thus, the plate 2 and the casing 6 can be completely fixed together. Lastly, as illustrated in FIG. 5, the original point detection sensor including the light emitting unit 21 and the light receiving unit 22 is fixed to the casing 6 by bonding.

Thus, the lens driving device 1 of FIG. 1 can be completed.

Especially, according to the lens driving device 1 of this embodiment, as described above, any user can easily and surely perform assembling while the rotation of the nut 5 is regulated, and assembling performance can be improved without damaging any components. Thus, the lens driving device 1 can be made inexpensive, and high in reliability and quality. The protruding portion 5a can be naturally guided to the fitting groove 11 by using the tapered surface 13, and hence, even when the nut 5 is downsized, the user can continue easy and accurate assembling irrespective of a size of the nut 5. As a result, future needs of downsizing are met.

The fitting groove 11 is formed to pass through the casing 6, and hence, during assembling, the fitted state of the protruding portion 5a in the fitting groove 11 can be viewed from the outside of the casing 6. Thus, assembling accuracy can be improved, and reliability of the lens driving device 1 can be enhanced.

In the embodiment described above, the fixing of the plate 2 to the casing 6 is carried out by applying the adhesive E in the insertion port 10 into which the fixing pin 12 has been inserted. However, a fixing method is not limited to that of using the adhesive E. For example, after the fixing pin 12 is inserted into the insertion port 10, the tip of the fixing pin 12 may be caulked while adding heat (thermal caulking) to fix the plate 2 to the casing 6.

In the embodiment described above, the tapered surface 13 for guiding the protruding portion 5a to the fitting groove 11 is formed in the casing 6 along the fitting groove 11. However, the tapered surface 13 may be formed not in the casing 6 but in the tip of the protruding portion 5a. Even in this case, similar operation effects can be obtained. Moreover, the tapered surfaces 13 may be formed in both the casing 6 and the protruding portion 5a.

The embodiment described above has been described by taking the example of the lens driving device 1 where the plate 2 and the casing 6 are stacked to be combined together. However, as illustrated in FIG. 16, a configuration may be employed where the plate 2 and the casing 6 are slid reverse to each other in the direction of the axial line L1 of the lead screw 4 to be combined together.

Figure 16:
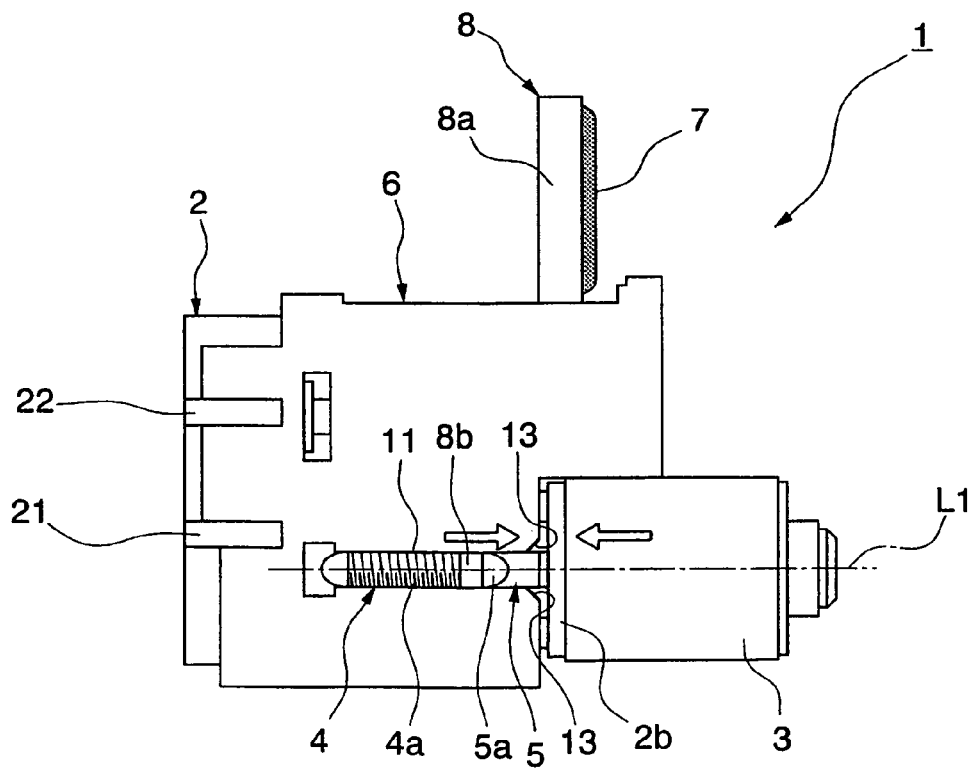
FIG. 16 is a front view illustrating a lens driving device where one end of a fitting groove is opened to a casing side according to a modified example of the present invention.

In such a case, as illustrated in FIG. 16, the fitting groove 11 may be formed so that one end thereof can be opened to the side surface of the casing 6. In this way, the plate 2 and the casing 6 can be combined together while sliding the plate 2 and the casing 6 so as to slide the protruding portion 5a from one end of the fitting groove 11. In this case, the tapered surface 13 for guiding the protruding portion 5a to the fitting groove 11 may be formed in the casing 6. In this way, even when a positional relationship between the protruding portion 5a and the fitting groove 11 slightly changes, the positional shifting can be rectified by the tapered surface 13, similarly enabling easy and accurate assembling.

Thus, in the case of assembling by the sliding method, similar operation effects can be obtained. Especially, in the case of the sliding method, assembling work is easier than that by the stacking method, and thus assembling performance can be improved.

Next, as an example of electronic equipment which incorporates a lens driving device, a disk reader for reading data from an optical disk is described.

Figure 17:
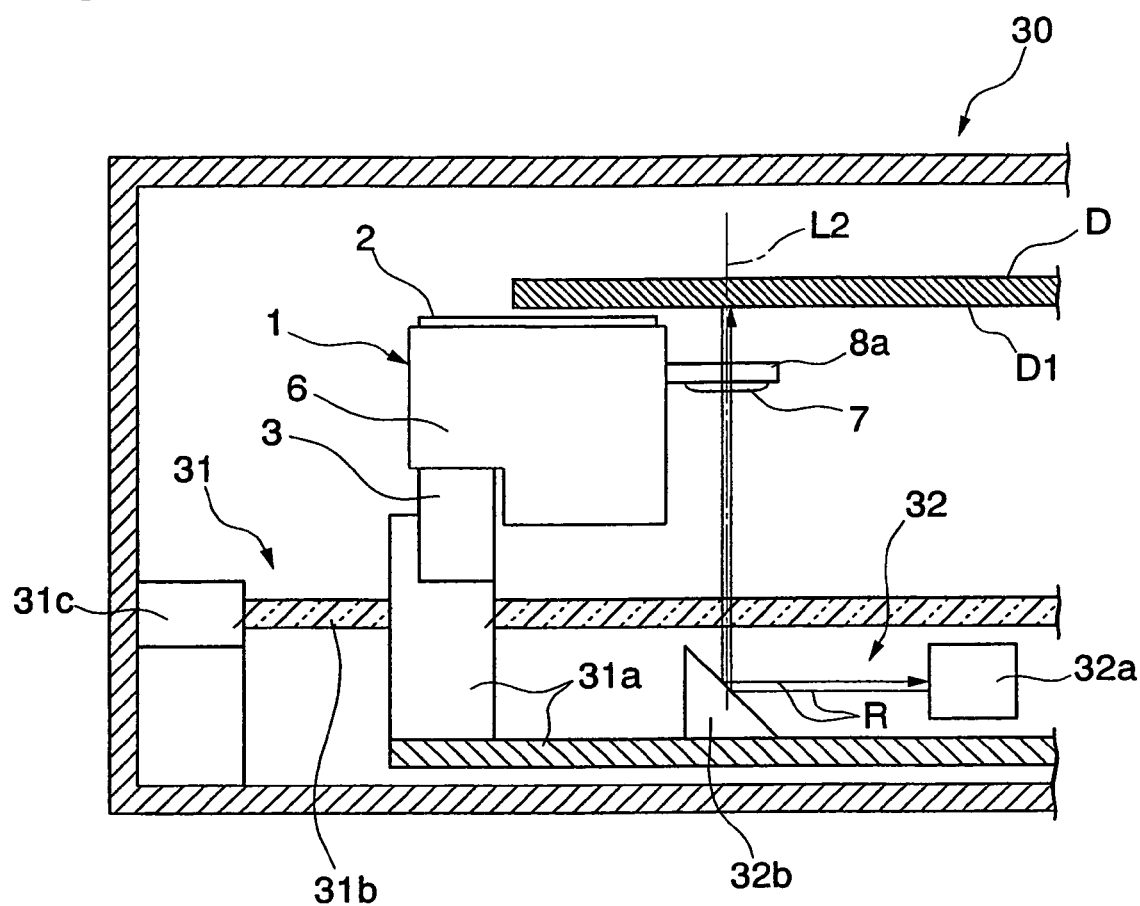
FIG. 17 is a diagram of an example of electronic equipment according to the present invention, specifically illustrating a configuration of a disk reader including the lens driving device of FIG. 1.

As illustrated in FIG. 17, a disk reader 30 includes the lens driving device 1, a moving mechanism 31 for moving the lens driving device 1 in a radial direction of an optical disk D, and a reading mechanism 32 for reading data recorded on the optical disk D.

The lens driving device 1 is disposed to face the optical disk D rotated by a spindle motor (not shown). Specifically, the lens driving device 1 is disposed so that a direction of an optical axis L2 of the lens 7 fixed to the lens frame 8 can be substantially orthogonal to a reading surface D1 of the optical disk D. The moving mechanism 31 includes a support unit 31a fixed to the fixing terminal 3a of the motor 3 of the lens driving device 1, a guide screw 31b threadingly engaged with a screw hole (not shown) of the support unit 31a to be disposed in the radial direction of the optical disk D, and a drive motor 31c for axially rotating the guide screw 31b. Driving the drive motor 31c to rotate the guide screw 31b enables movement of the support unit 31a along the guide screw 31b. Rotation of the support unit 31a is regulated by a rotation regulation mechanism (not shown). Thus, a radial position of the lens 7 with respect to the optical disk D can be appropriately adjusted.

The reading mechanism 32 includes a detector 32a for oscillating and receiving a laser beam R serving as detection light, and a mirror 32b for reflecting the laser beam R oscillated from the detector 32a toward the optical disk D, and the laser beam R reflected on the reading surface D1 of the optical disk D toward the detector 32a again. The detector 32a and the mirror 32b are fixed to the support unit 31a of the moving mechanism 31. Thus, the detector 32a can be moved in the radial direction of the optical disk D together with the lens driving device 1 to emit the laser beam R to a desired position of the optical disk D, and data recorded on the reading surface D1 can be appropriately read.

Especially, the disk reader 30 includes the inexpensive lens driving device 1 high in assembling performance and reliability, and hence reliability can similarly be improved to achieve high quality and low costs.

A technical scope of the present invention is not limited to the embodiment described above. Various changes can be made without departing from the spirit and scope of the present invention.

For example, in the embodiment described above, the fitting groove 11 is formed so as to pass through the casing 6. However, the fitting groove 11 does not have to pass through the casing 6. However, forming the fitting groove 11 so as to pass through the casing 6 enables direct viewing of the protruding portion 5a fitted in the fitting groove 11 from the outside of the casing 6, and hence reliability of assembling performance can be improved. Thus, this formation is preferable.

In the embodiment described above, the two convex portions 5b are formed in the side surface of the nut 5. However, the side surface itself may be brought close to the plate main body 2a without forming any convex portion 5b, and the nut 5 may be formed so that a space can be set to the fixed distance H. Even in this case, when the nut 5 is threadingly engaged with the lead screw 4, rotation of the nut 5 can be set within the predetermined angle range θ, and the protruding portion 5a can always be set in the same direction.

In this case, however, a size of the nut 5 has to be highly accurately set entirely, leading to a fear of difficult processing. Especially, in the case of forming the nut 5 by injection-molding, so-called sink marks are generated during molding, making it extremely difficult to guarantee high accuracy for a wide surface. On the other hand, when the convex portion 5b is formed, only the convex portion 5b has to be highly accurately finished. Thus, processing is much easier. In other words, a place where accuracy has to be guaranteed is clarified, and hence processing becomes very easy. Thus, as described above, the convex portion 5b is preferably formed.

What is claimed is:

1. A lens driving device, comprising:
    a motor mounted to a plate;
    a lead screw connected to the motor for undergoing rotation about an axial line thereof;
    a nut threadingly engaged with the lead screw, the nut having a convex protruding portion protruding outwardly from an outer peripheral surface of the nut;
    a casing mounted to the plate for housing the lead screw and the nut, the casing having a fitting groove linearly formed in the casing in a direction of the axial line for receiving the protruding portion in a state in which the protruding portion is fitted in the fitting groove so as to regulate rotation of the nut, and for movably guiding the protruding portion in the fitted state in the direction of the axial line to move the nut back and forth along the lead screw, at least one of the casing and the protruding portion of the nut having a tapered surface formed so as to forcibly guide the protruding portion toward the fitting groove to gradually fit the protruding portion into the fitting groove when the casing and the plate are mounted together; and
    a lens frame having a lens holding portion for holding a lens and having an abutting portion abutting the nut, the lens frame being supported on the casing so as to move in the direction of the axial line and to move in accordance with back and forth movement of the nut to move the lens back and forth in the direction of the axial line.

2. A lens driving device according to claim 1; wherein the fitting groove is formed so as to pass through the casing so that the protruding portion of the nut is visible from an exterior of the casing.

3. A lens driving device according to claim 1; wherein:
    the fitting groove is formed so that one end side thereof is opened to a side surface of the casing; and
    the casing and the plate are mounted together by relative sliding movement between the casing and the plate so that the protruding portion is slid from the one end side of the fitting groove and fitted into the fitting groove.

4. A lens driving device according to claim 1; wherein:
    the nut has a convex portion formed so as to protrude toward the plate; and
    when the nut is threadingly engaged with the lead screw, the convex portion of the nut comes into contact with the plate to set a rotation of the nut within a predetermined rotational angle range, and to position the protruding portion of the nut within a predetermined fixed range.

5. An electronic equipment comprising the lens driving device according to claim 1.

6. A lens driving device according to claim 1; wherein the casing has the tapered surface.

7. A lens driving device according to claim 6; wherein the tapered surface is formed along the fitting groove of the casing so as to guide the protruding portion of the nut toward the fitting groove of the casing in a self-aligned manner.

8. A lens driving device according to claim 1; wherein the fitting groove of the casing is configured to receive the protruding portion of the nut for regulating rotation of the nut so that when the lead screw rotates about the axial line, the nut does not rotate in accordance with rotation of the lead screw.

9. A lens driving device according to claim 1; wherein the protruding portion of the nut has a tip configured to come into point-contact with the fitting groove of the casing.

10. A lens driving device according to claim 1; wherein a portion of the nut opposite to the protruding portion has a pair of convex portions formed so as to protrude toward the plate; and wherein when the nut is threadingly engaged with the lead screw, the convex portions come into contact with the plate to set a rotation of the nut within a predetermined rotational range.

11. A disk reader comprising:
    a lens driving device according to claim 1;
    a moving mechanism that moves the lens driving device in a radial direction of an optical disk; and
    a reading mechanism that reads data recorded on a reading surface of the optical disk.

12. A disk reader according to claim 11; wherein the lens driving device is disposed so that a direction of an optical axis of the lens held by the lens frame is substantially orthogonal to the reading surface of the optical disk.

13. A lens driving device comprising:
    a motor;
    a lead screw connected to the motor for undergoing rotation about an axial line of the lead screw;
    a nut threadingly engaged with the lead screw for undergoing rotational and back and forth movement along the axial line of the lead screw;
    a casing detachably mounted to a plate and housing the lead screw and the nut;
    rotation regulation means for regulating the rotation of the nut so that when the lead screw rotates about the axial line, the nut does not rotate in accordance with rotation of the lead screw, the rotation regulation means comprising a protruding portion protruding outwardly from an outer peripheral surface of the nut and a fitting groove formed in the casing in the direction of the axial line of the lead screw for receiving the protruding portion; and a lens frame having a lens holding portion for holding a lens and mounted to undergo movement in the direction of the axial line of the lead screw in accordance with back and forth movement of the nut to adjust a position of the lens, wherein at least one of the casing and the protruding portion of the nut has a tapered surface formed so as to forcibly guide the protruding portion toward the fitting groove so that the fitting groove gradually receives the protruding portion when the casing is detachably mounted to the plate.

14. A lens driving device according to claim 13; wherein the fitting groove is configured to movably guide the protruding portion in the direction of the axial line of the lead screw while the protruding portion is being received by the fitting groove to facilitate back and forth movement of the nut along the axial line.

15. A lens driving device according to claim 13; wherein the lens frame has an abutting portion abutting the nut to permit movement of the lens frame in accordance with back-and-forth movement of the nut.

16. An electronic equipment comprising the lens driving device according to claim 13.

17. A disk reader comprising:
a lens driving device according to claim 13;
a moving mechanism that moves the lens driving device in a radial direction of an optical disk; and
a reading mechanism that reads data recorded on a reading surface of the optical disk.

18. A lens driving device comprising:
a motor;
a lead screw connected to the motor for undergoing rotation about an axial line of the lead screw;
a nut threadingly engaged with the lead screw for undergoing rotational and back and forth movement along the axial line of the lead screw;
a casing housing the lead screw and the nut;
rotation regulation means for regulating the rotation of the nut so that when the lead screw rotates about the axial line, the nut does not rotate in accordance with rotation of the lead screw, the rotation regulation means comprising a protruding portion protruding outwardly from an outer peripheral surface of the nut and a fitting groove formed in the casing in the direction of the axial line of the lead screw for receiving the protruding portion; and
a lens frame having a lens holding portion for holding a lens and mounted to undergo movement in the direction of the axial line of the lead screw in accordance with back and forth movement of the nut to adjust a position of the lens;
wherein the motor and casing are mounted to a plate; and
wherein a portion of the nut opposite to the protruding portion has a pair of convex portions configured to protrude toward the plate so that when the nut is threadingly engaged with the lead screw, the convex portions come into contact with the plate to set a rotation of the nut within a predetermined rotational range.

* * * * *